(12) United States Patent
Annaratone

(10) Patent No.: US 6,760,456 B1
(45) Date of Patent: *Jul. 6, 2004

(54) PLANAR SPEAKER FOR MULTIMEDIA LAPTOP PCS

(75) Inventor: Marco Annaratone, Menlo Park, CA (US)

(73) Assignee: Hewlett-Packard Development Company L.P., Houston, TX (US)

(*) Notice: Subject to any disclaimer, the term of this patent is extended or adjusted under 35 U.S.C. 154(b) by 517 days.

This patent is subject to a terminal disclaimer.

(21) Appl. No.: 09/684,556

(22) Filed: Oct. 5, 2000

Related U.S. Application Data

(63) Continuation of application No. 09/057,841, filed on Apr. 9, 1998, now Pat. No. 6,151,401.

(51) Int. Cl.$^7$ .............................................. H04R 25/00
(52) U.S. Cl. ..................... 381/306; 381/333; 381/388; 381/386; 361/683
(58) Field of Search ................................ 381/152, 306, 381/333, 334, 186, 388, 386; 361/681, 683; 181/167

(56) References Cited

U.S. PATENT DOCUMENTS

| 4,388,492 A | 6/1983 | Sato ........................ 179/1 GA |
| 4,847,903 A | 7/1989 | Schotz .......................... 381/3 |
| 5,095,382 A | 3/1992 | Abe ............................ 359/189 |
| 5,675,426 A | 10/1997 | Meisner et al. .............. 358/838 |
| 5,732,140 A | 3/1998 | Thayer ......................... 381/24 |
| 5,812,369 A | 9/1998 | Hsu et al. .................... 361/683 |
| 5,838,537 A | 11/1998 | Lundgren et al. ........... 361/683 |
| 5,852,545 A | 12/1998 | Pan-Ratzlaff ............... 361/683 |
| 5,978,215 A | 11/1999 | Chiu et al. ................... 361/687 |
| 6,040,978 A | 3/2000 | Spencer ...................... 361/683 |
| 6,243,473 B1 * | 6/2001 | Azima et al. ............... 381/152 |
| 6,332,029 B1 * | 12/2001 | Azima et al. ............... 381/152 |

* cited by examiner

*Primary Examiner*—Suhan Ni

(57) ABSTRACT

A portable computer system with planar speakers. The planar speakers are fabricated with a coplanar array of small, low cost, durable, electromagnetic speaker elements mounted on a panel. The planar speakers can be attached to the lid of the computer system. The planar speakers can slide into a compartment in the lid of the computer system when not in use and slide out of the compartment for use with greater physical separation than that of built-in speakers. Alternatively, the planar speakers are attached to the lid via a hinge and folded against the lid when not in use. The planar speakers are folded outward extending the planar speakers beyond the lid for use with greater physical separation than that of built-in speakers. The planar speakers can be detachable from the remainder of the computer system for greater spacing and variable positioning of the planar speakers for improved stereo sound reproduction. Detached planar speakers also permit transport or storage of the planar speakers separately from the remainder of the computer system. Such planar speakers also have application in portable music reproduction devices and, in larger area form, for use in home audio systems.

16 Claims, 5 Drawing Sheets

PLANAR SPEAKER FOR MULTIMEDIA LAPTOP PCS

This is a continuation of application Ser. No. 09/057,841, filed Apr. 9, 1998, now U.S. Pat. No. 6,151,401.

FIELD OF THE INVENTION

This invention relates generally to sound reproduction in computer and audio systems and, more particularly, to stereo sound reproduction in a portable computer system.

BACKGROUND OF THE INVENTION

High quality sound reproduction is commonly desired in present day computer systems. Many manufacturers offer speaker systems designed specifically for desktop computers. These systems can provide high volume and accurate reproduction across most of the human audible sound spectrum and typically employ conventional, electromagnetic speakers. Such speakers consist of a few electromagnetic speaker elements in an enclosure. The speaker elements are based on audio transducers, which utilize conical or other three-dimensional vibrating members. Conventional, electromagnetic speakers tend to be bulky or heavy.

Desktop computer speaker systems are typically too large, heavy, and fragile for portable use. Due to space and weight constraints, portable computers—which include variants such as laptops, notebooks, PDAs and so on—typically are equipped with small, conventional electromagnetic speakers built into the computer's enclosure. These small, conventional speakers provide poor sound reproduction; their volume and reproduction of the audible spectrum are limited. Poor stereo separation is typical of portable computers due to the limited physical separation achievable for built-in speakers. In spite of these constraints, there exists an increasing demand for high quality, stereo sound reproduction in portable computer systems. Computer users increasingly choose portable computers for the convenience of a small, moveable system while traditional portable computer users, e.g. business travelers, continue to desire good sound reproduction for such applications as audio-visual presentations.

Because thinness is a desirable feature in portable computer configurations, use of speakers comprising a thin enclosure and good sound quality would be one approach to mitigate the portability problem of a computer system with good sound reproduction. Existing thin speakers, generally called "planar speakers", are usually based on two basic design types; electromagnetic and electrostatic. An electromagnetic planar speaker typically possesses a large, flat diaphragm and a set of relatively strong, permanent, strip magnets. The diaphragm is susceptible to tearing. An electrostatic planar speaker employs a very high voltage, which causes a susceptibility to arcing. Over time, arcing can destroy the electrostatic speaker's diaphragm. Though planar speakers of a size suitable for portability can be produced by either of these existing approaches, such speakers would be expensive and lack the reliability of conventional electromagnetic speakers.

The additional problem of good stereo separation in portable computer systems can be solved by placing two speakers, i.e. the left and right sound reproduction channels, at some distance to either side of the portable computer. This complicates the problem of portability, however, because portable computer systems must be compact. A solution to the problem of stereo separation is desirable.

SUMMARY OF THE INVENTION

An object of the invention is to solve the problems of sound reproduction in portable computer systems: sound quality, i.e. accuracy and volume; stereo separation; durability; low cost; low power consumption; and portability.

In accordance with the present invention, a portable computer system includes: a base for holding electronic components that generate electrical signals; a lid that includes a monitor; and one or more planar speakers. A planar speaker is a thin audio output device that renders audio signals from electrical signals produced by the base. The thickness of each planar speaker is substantially less than the height or width of the planar speaker.

The flat, thin configuration of the planar speakers is achieved by a construction that includes a plurality of low cost, durable, electromagnetic speaker elements. These speaker elements are mounted on a panel in a coplanar arrangement and electrically connected with serial or parallel connections to obtain a desired impedance for the planar speaker. The panel and speaker elements are held within and protected by an enclosure. Sound equalization techniques can compensate for limitations in the sound reproduction spectrum of the individual speaker elements.

In one embodiment of the invention, two planar speakers are attached to the lid of the portable computer system. In one aspect, the planar speakers slide within the lid for storage. The planar speakers slide out of the lid to give greater physical separation than is possible with conventional built-in speakers. In another aspect, each planar speaker is attached to the lid via a hinge and folded against the lid when not in use. The planar speakers are folded outward so that they extend beyond the lid for use with greater physical separation than that of built-in speakers.

In another embodiment of the invention, the planar speakers are detachable from the lid. This permits an even greater spacing and variable positioning of the planar speakers for improved stereo sound reproduction. Detached planar speakers also permit transport or storage of the planar speakers separately from the remainder of the portable computer system.

Alternatively, the planar speakers can be used in portable music reproduction systems; in portable television sets; in aircraft to provide stereo audio to individual seats; or in a larger surface area form which includes hundreds or thousands of speaker elements for home audio reproduction systems.

BRIEF DESCRIPTION OF THE DRAWINGS

The following detailed description makes apparent other purposes and advantages of the invention, with reference to the drawings in which.

DETAILED DESCRIPTION OF PREFERRED EMBODIMENTS OF THE INVENTION

Overview

Figure 1:
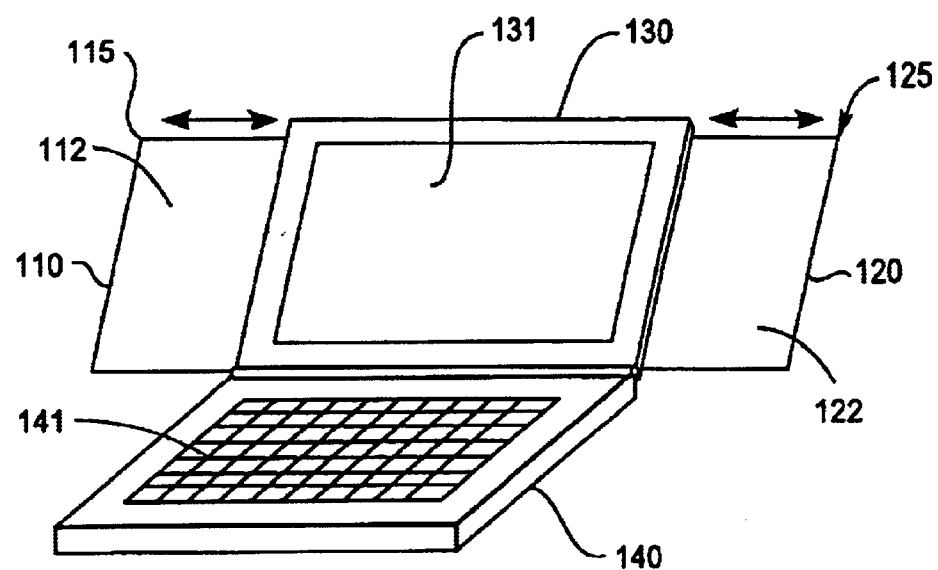
FIG. 1 depicts a computer system with two planar speakers slidably attached.

FIG. 1 depicts an embodiment in accordance with the invention in which two planar speakers 110 and 120 are included in a portable computer system 100. The portable computer system 100 includes the planar speakers 110 and 120, a lid 130, a monitor 131 in the lid 130 for video output display, a base 140 for holding electronic components that generate electrical signals, and a keyboard 141 in the base 140. The planar speaker 110 has an audio signal emitting surface 112, and planar speaker 120 has an audio signal emitting surface 122.

The planar speakers 110 and 120 are thin output devices for converting electrical signals into audio signals. The planar speakers 110 and 120 include electromagnetic speaker elements mounted on a panel in a coplanar arrangement (not shown in FIG. 1). In a practical application, the electromagnetic speaker elements and panel are within an enclosure, in part for protection and support, such that the planar speakers 110 and 120 have a flat, thin configuration. That is, the thickness of the planar speakers 110 and 120 is substantially less than the height and width of the planar speakers 110 and 120. Generally, the thickness of the planar speaker 110 is less than one-fifth the square root of the area of the audio signal emitting surface 112. This thin shape of the planar speakers 110 and 120 contributes to the portability of the computer system 100. Portability is further achieved in the manner of attachment of the planar speakers 110 and 120 to the lid 130.

Speaker Attachment to the Computer

FIGS. 1 through 4 depict various embodiments for placement, use, and attachment of the planar speakers 110 and 120 in the portable computer system 100. In the embodiment of the invention depicted in FIG. 1, the planar speakers 110 and 120 are slidably attached to the lid 130, one at each side edge of the lid 130. The planar speakers 110 and 120 can slide into an interior portion of the lid 130 when not in use, for storage, or for transport.

Figure 2:
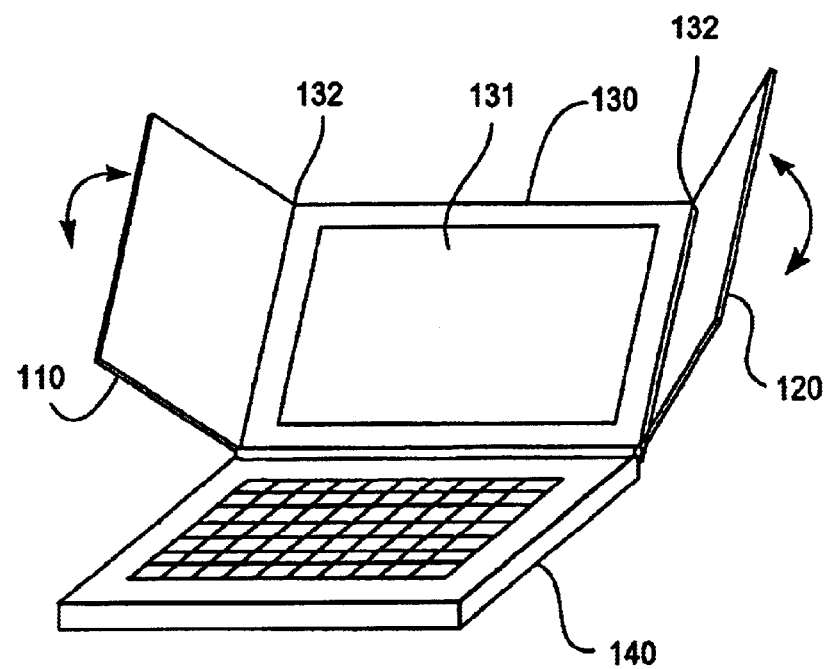
FIG. 2 depicts a computer with two, hinged planar speakers.
Figure 3:
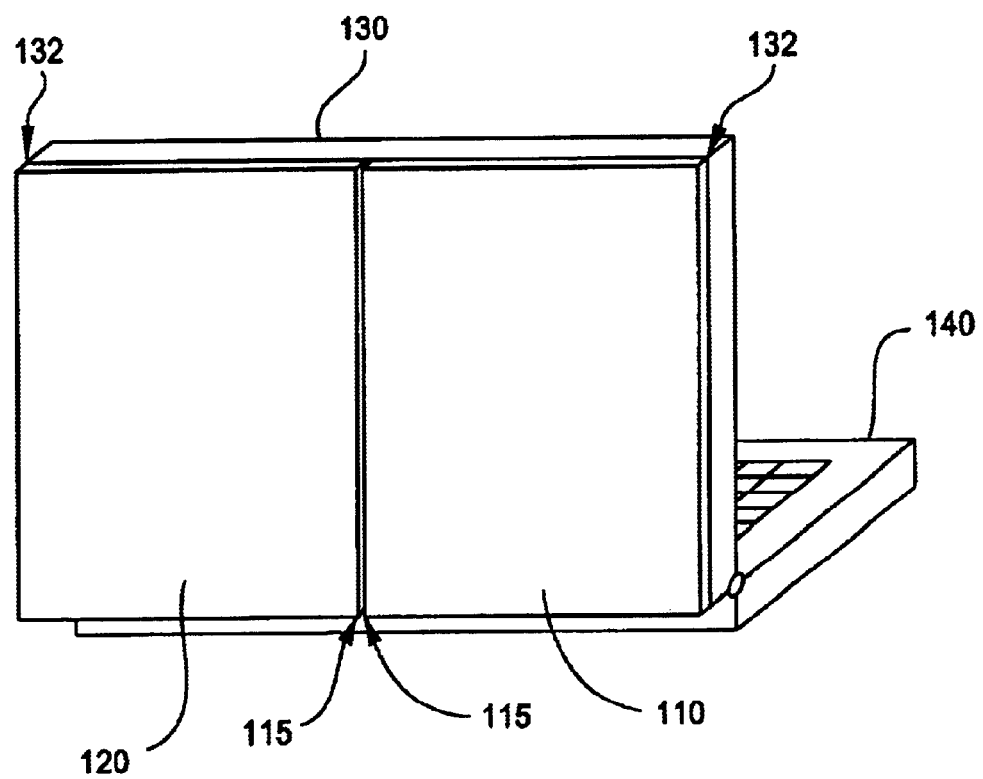
FIG. 3 depicts a computer system with two planar speakers folded against an outer surface of a lid of the computer system.

FIG. 2 depicts another embodiment of the invention in which the planar speakers 110 and 120 are attached via hinges 132 to the monitor 130, one at each side edge of the monitor 130. The planar speakers 110 and 120 can fold against the monitor screen 131 for transport. FIG. 3 depicts another embodiment in which the speakers fold against the outer surface of the lid 130. As depicted in FIG. 3, the planar speakers 110 and 120 are folded for storage. The planar speakers 110 and 120 have outer edges 115 and 125 that meet when the planar speakers 110 and 120 are folded for storage. Thus, the monitor screen 131 can be seen and the portable computer system 100 used without deploying the planar speakers 110 and 120.

Figure 4:
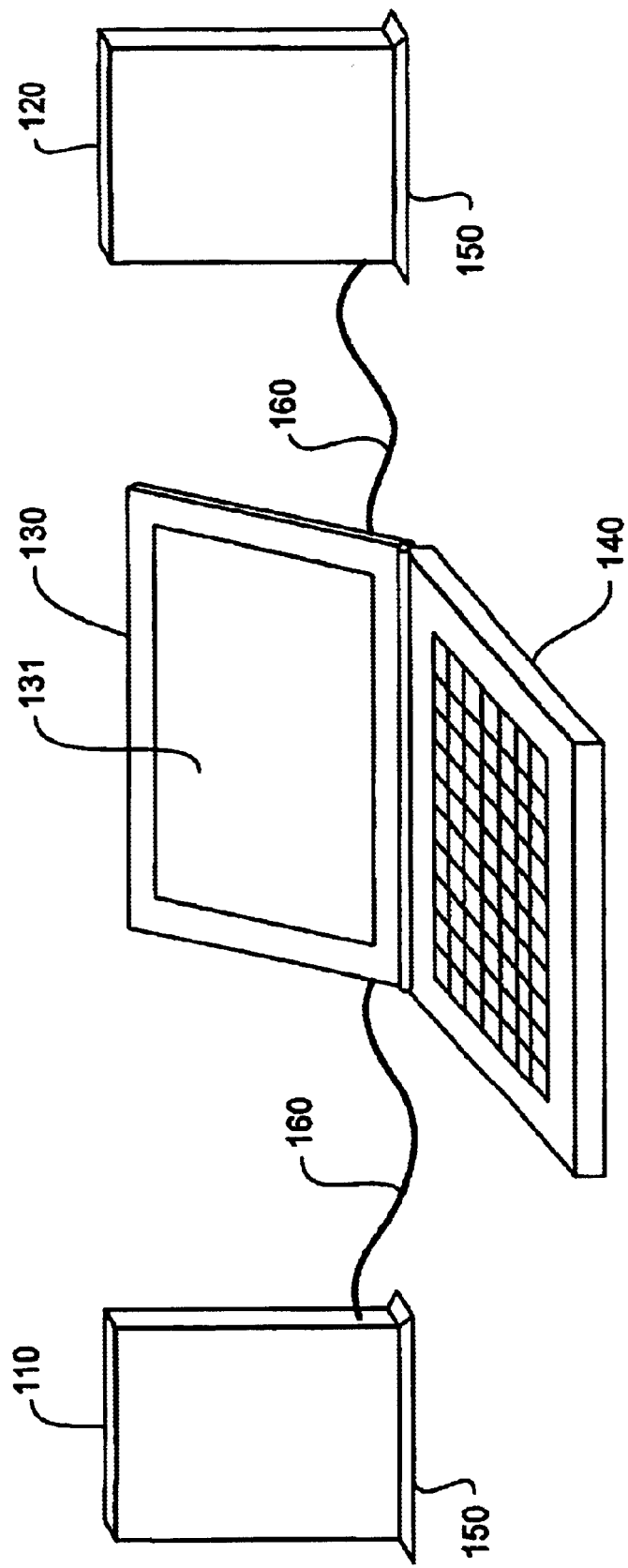
FIG. 4 shows a computer system with two detached planar speakers.

In another embodiment of the invention, the planar speakers 110 and 120 are detachable from the lid 130. As depicted in FIG. 4, the planar speakers 110 and 120 can then be placed at a greater distance from each other in order to enhance the stereo separation of the audio signals emitted by the planar speakers 110 and 120. As shown in FIG. 4, the planar speakers 110 and 120 are connected to the base 140 by wire 160. Alternatively, the planar speakers can be connected by wireless connection, such as infrared or radio transmission (not shown). The planar speakers 110 and 120 can be held in position by any of various means to provide a base 150, for example: detachable bases 150 which are attached to the bottom edges of the planar speakers 110 and 120; folding tabs built into the bottom of the speakers 110 and 120 (not shown); or suction cups on the backside of the planar speakers for attaching to a flat surface (not shown).

Speaker Structure

Figure 5:
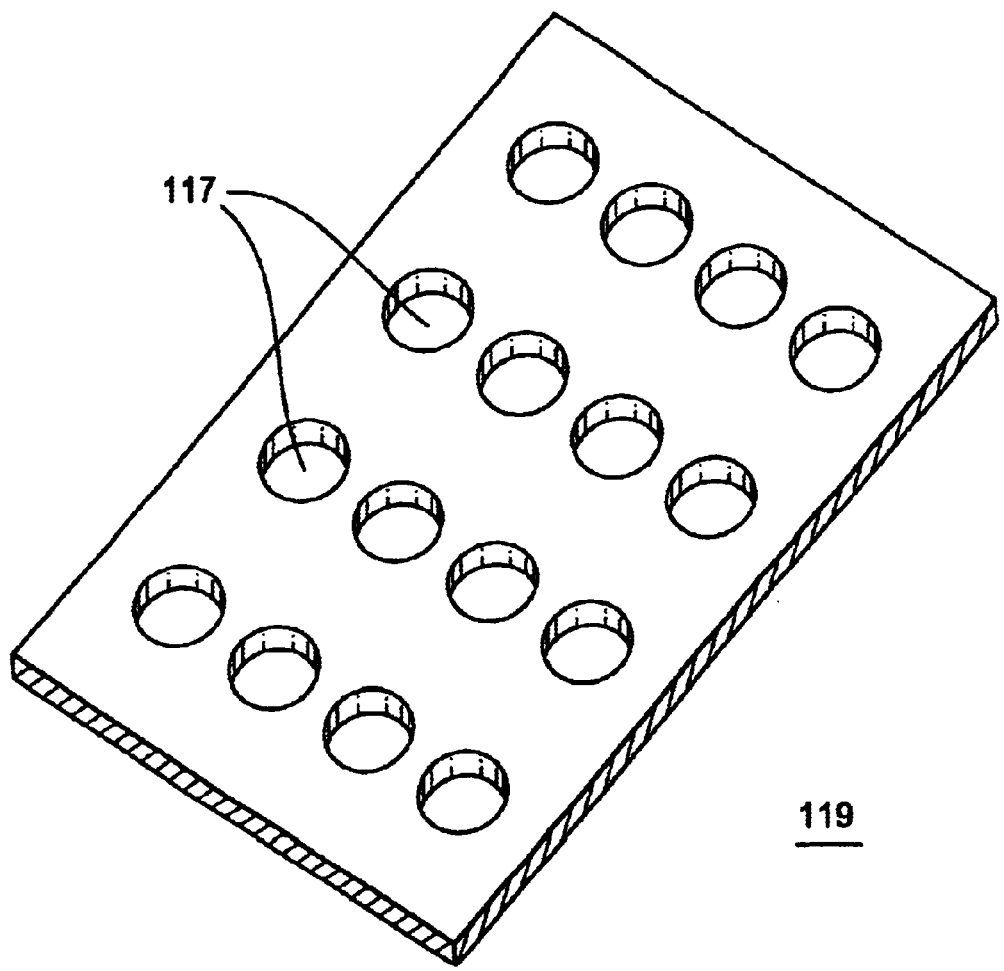
FIG. 5 shows a panel with sixteen through holes for mounting sixteen speaker elements (not shown).

FIG. 5 shows a panel 119 held within the enclosure of, for example, planar speaker 110. The panel 119 has one through hole 117 for mounting of each electromagnetic speaker element (not shown), sixteen in this case. Alternatively, each electromagnetic speaker element can be mounted on the surface of the panel 119 or in a recess that partially extends through the panel 119.

Figure 6:
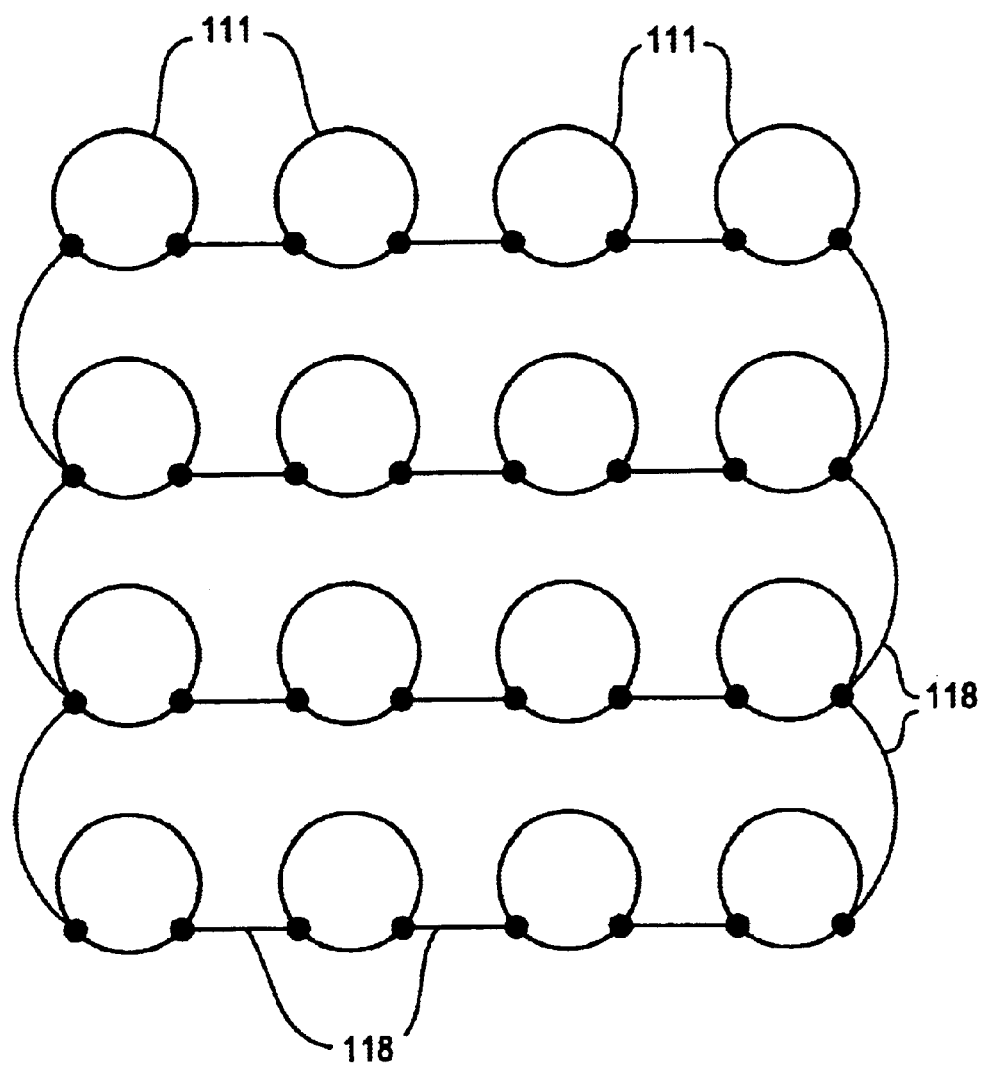
FIG. 6 shows a four by four array of speaker elements used to produce a planar speaker from sixteen small, speaker elements.

FIG. 6 shows an example array of four by four electromagnetic speaker elements 111 to be mounted on the panel 119. Each electromagnetic speaker element 111 includes a single, small audio transducer. The speaker elements 111 are coplanar to each other. For example, the speaker elements 111 can be arranged in a regular, close-packed array to maximize the number of speaker elements 111 per unit surface area of the panel 119. The principles of the invention can be practiced with alternative arrangements of speaker elements 111 on the panel 119.

The number of speaker elements 111 is selected based on the desired size, i.e. area, of the planar speaker 110, the diameter of the speaker elements 111, and the desired maximum volume for the planar speaker 110. An example of a planar speaker 110 uses LZR Electronics Model No. LZR36R04 button speakers for the speaker elements 111. These speaker elements 111 have an impedance of 8Ω, are 36.0 mm in diameter, 3.8 mm in thickness, and weigh 4.8 gm. The maximum power consumption of each LZR button speaker is about 0.2 W. An array of sixteen such speaker elements 111 thus has a maximum power consumption of about 3 W, i.e. the maximum volume before distortion sets in is reached at 3 W. At this power level, a volume of about 75 dB is obtained at a distance of about 30 cm from the audio emitting surface 112. Use of speaker elements 111 of greater thickness can provide greater power and volume capacity.

FIG. 6 depicts the electrical coupling scheme of the speaker elements 111. Series and parallel connections 118 serve to provide the desired impedance of the overall speaker element 111 array of planar speaker 110. In the example of FIG. 6, the sixteen speaker elements 111 are electrically coupled to preserve an overall impedance of 8Ω. Each row of four speaker elements 111 is connected in series via wires 118. The four resulting rows are connected in parallel via wires 118. The number, placement, and wiring of the speaker elements 111 is varied to produce a planar speaker 110 having a desired shape and impedance.

Advantages of the invention are: durability, low cost, and low power consumption through use of electromagnetic speakers for the speaker elements 111; a thin design by use of small, thin speaker elements 111; and, good sound quality by use of a plurality of speaker elements 111 in the planar speaker 110. Electronic equalization can be used with the array of speaker elements 111 to further improve the sound quality by linearizing the frequency response at lower frequencies, for example below 1 KHz. The directivity of the audio signals produced by the array can be controlled as described in U.S. Pat. No. 5,233,664, "Speaker System and Method of Controlling Directivity Thereof" issued to Yanaga et al. on Aug. 3, 1993, incorporated by reference herein.

The above embodiments of the invention are merely illustrative. Various modifications and changes may be made by those skilled in the art which will embody the principles of the invention and fall within the scope thereof. For example, these modifications can include variations in the size, shape, and number of planar speakers and the site of attachment of the planar speakers in the portable computer system. Alternative uses for the planar speakers can be envisioned, for example: in portable music reproduction systems; in portable television sets; in aircraft to provide stereo audio to individual seats; or in a larger surface area form which includes hundreds or thousands of speaker elements for home audio reproduction systems.

I claim:

1. An apparatus for rendering audio signals from electrical signals produced by a signal generator, comprising;

a plurality of panels;

a plurality of electromagnetic speaker elements mounted coplanar to each other on each of the plurality of panels;

a connector for mechanically mounting the plurality of panels on the signal generator; and a circuit for electrically connecting the plurality of speaker elements to the signal generator;

wherein the signal generator includes a lid and a base coupled to the lid, the lid including a screen surface and a rear surface;

wherein each panel is configured to fold against the rear surface of the lid.

2. The apparatus of claim 1 wherein each panel is housed in an enclosure, the enclosure having a thickness that is less than one fifth of a square root of a surface area of the enclosure.

3. The apparatus of claim 1 wherein the plurality of speaker elements are electrically connected through wires with both serial and parallel connections between the plurality of speaker elements to obtain a desired impedance for the plurality of speaker elements.

4. The apparatus of claim 1 wherein the plurality of speaker elements are arranged in an array.

5. The apparatus of claim 1 wherein each of the plurality of speaker elements comprises an electromagnetic audio transducer with three-dimensional vibrating members.

6. The apparatus of claim 1 wherein each of the plurality of panels has through holes for mounting the plurality of speaker elements.

7. The apparatus of claim 1 wherein each panel is rotatably mounted on the signal generator.

8. The apparatus of claim 1 wherein the plurality of panels are detachably mounted on the signal generator so that each of the plurality panels can be detached from the signal generator for use at a distance from the signal generator.

9. The apparatus of claim 8 wherein each of the plurality of panels includes a stand to support that panel when that panel is detached from the signal generator.

10. The apparatus of claim 1 wherein the signal generator is a computer.

11. A portable computer system, including a base for holding electronic components that generate electrical signals and a lid, comprising:

a plurality of panels;

a plurality of electromagnetic speaker elements mounted coplanar to each other on each of the plurality of panels;

means for mechanically mounting each panel to opposite side edges of the lid; and means for electrically connecting the plurality of speaker elements to the base;

wherein the lid includes a screen surface and a rear surface;

wherein each panel is configured to fold against the rear surface of the lid.

12. The portable computer system of claim 11 wherein each panel is rotatably mounted on the lid.

13. The portable computer system of claim 11 wherein each panel can be detached from the lid to operate at a distance from the base.

14. The portable computer system of claim 13 wherein the means for electrically connecting is a wired connection.

15. The portable computer system of claim 13 wherein the means for electrically connecting is a wireless connection.

16. An apparatus for rendering audio signals from electrical signals produced by a signal generator, comprising:

a panel;

a plurality of electromagnetic speaker elements mounted coplanar to each other on the panel;

a connector mechanically mounting the panel on the signal generator; and a connector electrically connecting the electromagnetic speaker elements to the signal generator;

wherein the signal generator includes a lid and a base coupled to the lid, the lid including a screen surface and a rear surface;

wherein the panel is configured to fold against the rear surface of the lid.

* * * * *